(12) United States Patent
Angerer

(10) Patent No.: US 8,511,194 B2
(45) Date of Patent: Aug. 20, 2013

(54) TRANSMISSION DRIVE UNIT

(75) Inventor: Christof Angerer, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 162 days.

(21) Appl. No.: 13/050,098

(22) Filed: Mar. 17, 2011

(65) Prior Publication Data

US 2012/0118089 A1 May 17, 2012

(30) Foreign Application Priority Data

Nov. 16, 2010 (DE) .......................... 10 2010 043 974

(51) Int. Cl.
*F16H 1/16* (2006.01)
(52) U.S. Cl.
USPC .......................................... 74/425; 74/425.5
(58) Field of Classification Search
USPC ........................................ 74/425, 425.5, 416
See application file for complete search history.

(56) References Cited

U.S. PATENT DOCUMENTS

| 6,564,666 | B1 * | 5/2003 | Marcel | 74/425 |
| 6,789,443 | B1 * | 9/2004 | Torii et al. | 74/425 |
| 6,940,194 | B1 * | 9/2005 | Lauk | 310/90 |
| 7,571,666 | B2 * | 8/2009 | Borbe et al. | 74/606 R |
| 8,011,265 | B2 * | 9/2011 | Menjak et al. | 74/425 |
| 8,069,745 | B2 * | 12/2011 | Strieter et al. | 74/425 |
| 8,234,948 | B2 * | 8/2012 | Kohigashi et al. | 74/424 |

* cited by examiner

*Primary Examiner* — David M Fenstermacher
(74) *Attorney, Agent, or Firm* — Michael Best & Friedrich LLP

(57) ABSTRACT

A transmission drive unit (1) comprising a drive motor (2) having an output shaft (3) and an output toothing (4), a threaded spindle (8) having a worm wheel (5) that is in engagement with the output toothing (4), a first housing part (6) produced from plastic, having axial bearing locations (65, 66) and radial bearing locations (63, 64) for supporting the threaded spindle (8), and a second housing part (7) produced from metal, having a through opening (75) for the through passage of the threaded spindle (8), and at least one coupling region (76, 77) for fixing the transmission drive unit (1) to a component.

18 Claims, 5 Drawing Sheets

TRANSMISSION DRIVE UNIT

BACKGROUND OF THE INVENTION

The present invention relates to a transmission drive unit having an improved transmission of forces that can occur, in particular, in the case of an accident.

Transmission drive units are known in differing realizations from the prior art. For example, such drives are used in motor vehicles, for the purpose of adjusting movable devices, for example for seat adjustment. Such transmission drive units have at least one interface to the vehicle, two interfaces to the customer structure usually being required in the case of spindle motors. Differing interfaces are to be provided in this case, according to the vehicle. Further, differing installation situations arise, depending on the vehicle. The result of this is that it is necessary to provide a multiplicity of individual components on the transmission drive unit in order to be properly adapted to the respective application. This results in a multiplicity of designs, whereby the production costs of such drive units are increased. It would therefore be desirable to have a transmission drive unit that can be adapted as easily as possible to differing installation situations and that has as many shared components as possible. A further problem arises in the selection of the material of differing components of the transmission drive units. In principle, greater forces can be achieved through use of metal housings. For weight reasons, aluminum is normally used in this case. Nevertheless, since the required tolerances cannot be achieved with the methods of producing such a metal housing, a stock-removing machining of functional surfaces must be performed. Alternatively, it would be possible to provide transmission housings made of plastic, which, however, can transfer only lesser forces. Frequently, therefore, such plastic housings break in the case of an accident, which can result in persons being endangered, for example on a vehicle seat.

SUMMARY OF THE INVENTION

In contrast therewith, the transmission drive unit according to the invention, has the advantage that a separation of functional surfaces and of interfaces, e.g. to a vehicle, becomes possible. The interface component in this case is produced from metal, and the components that have functional surfaces can be produced from plastic. Present as functional surfaces in this case are, in particular, bearing surfaces for a worm gear, a spindle, brush holder and motor output shaft. According to the invention, therefore, a combination of housing parts of plastic and of metal is proposed. The plastic parts in this case assume bearing functions for the motor and transmission, the plastic parts being able to be produced directly, without after-machining, e.g. in an injection molding process. The metal housing assumes the transmission of forces to the interfaces of the transmission drive unit, no stock-removing after-machining being needed for the interfaces, including, for example, in the case of the metallic housing part being produced by aluminum die casting. Alternatively, the metal housing is a part produced by stamping and bending. The transmission drive unit according to the invention preferably has a second interface at a spindle nut, which is disposed on a threaded spindle. Alternatively, a plunge spindle arrangement is provided.

Preferably, the first housing part produced from plastic has a main housing body, and a housing cover that is preferably detachable from the main body. This enables the assembling of the transmission drive unit, in particular, to be significantly simplified. Further, the housing cover preferably has a tab, on which the second housing part produced from metal is disposed.

Preferably, the second, metallic housing part is realized so as to be closed circumferentially, and partially surrounds the first plastic housing part. Particularly preferably, the metallic housing part in this case has four side surfaces, such that the second metallic housing part has a quadrangular shape. Particularly preferably in this case, interfaces are provided at tabs, which project outwardly from one or more of the side surfaces of the second housing part.

Further, preferably, the first first housing part produced from plastic has at least one radial bearing location and an axial bearing location for a threaded spindle. This enables the threaded spindle to be supported on a component, in both the axial direction and the radial direction. Further, preferably, a hardened plate element, which bears on the first housing part and assumes the axial support of the threaded spindle, is provided for the axial support in this case. Preferably, the hardened plate element in this case is disposed in a slot in the main housing body of the first housing part.

Further, preferably, the transmission drive unit comprises a spring element, which biases the threaded spindle in the axial direction.

Further, preferably, the first housing part produced from plastic and/or the second, metallic housing part are realized symmetrically in relation to a plane that comprises a spindle axis and that is perpendicular to an output shaft of the drive motor. Further, preferably, the first and/or second housing part is/are symmetrical in relation to a second plane of symmetry that is perpendicular to the spindle axis. As a result, in particular, the threaded spindle can be disposed to the left or to the right, starting from the output shaft, without other parts being required for this purpose. The number of shared components can thereby be increased significantly.

Particularly preferably, the first and the second housing part constitute a transmission housing, in which an output toothing and a worm wheel of the threaded spindle are accommodated.

Preferably, a positive and/or non-positive connection is provided between the first housing part and the second housing part.

Preferably, the metallic second housing part is realized in such a way that there is an overlap, and the second housing part can be bent up. As a result, in particular, the second housing part can be fitted very easily to the first housing part. The overlap at the second housing part is preferably secured by means of a connecting element, e.g. a screw. Alternatively, the second housing part has two flanges, which project outwards, perpendicularly in relation to a side part, and at which the second housing part can be bent up. The flanges, likewise, can be secured, for example, by means of a connecting element.

The transmission drive unit according to the invention is used particularly preferably in vehicles, for example in the case of electric seat adjustments.

BRIEF DESCRIPTION OF THE DRAWINGS

A preferred exemplary embodiment of the invention is described in detail in the following with reference to the accompanying drawing. In the drawing.

DETAILED DESCRIPTION

A transmission drive unit 1 according to a preferred exemplary embodiment of the invention is described in detail in the following with reference to FIGS. 1 to 5.

Figure 1:
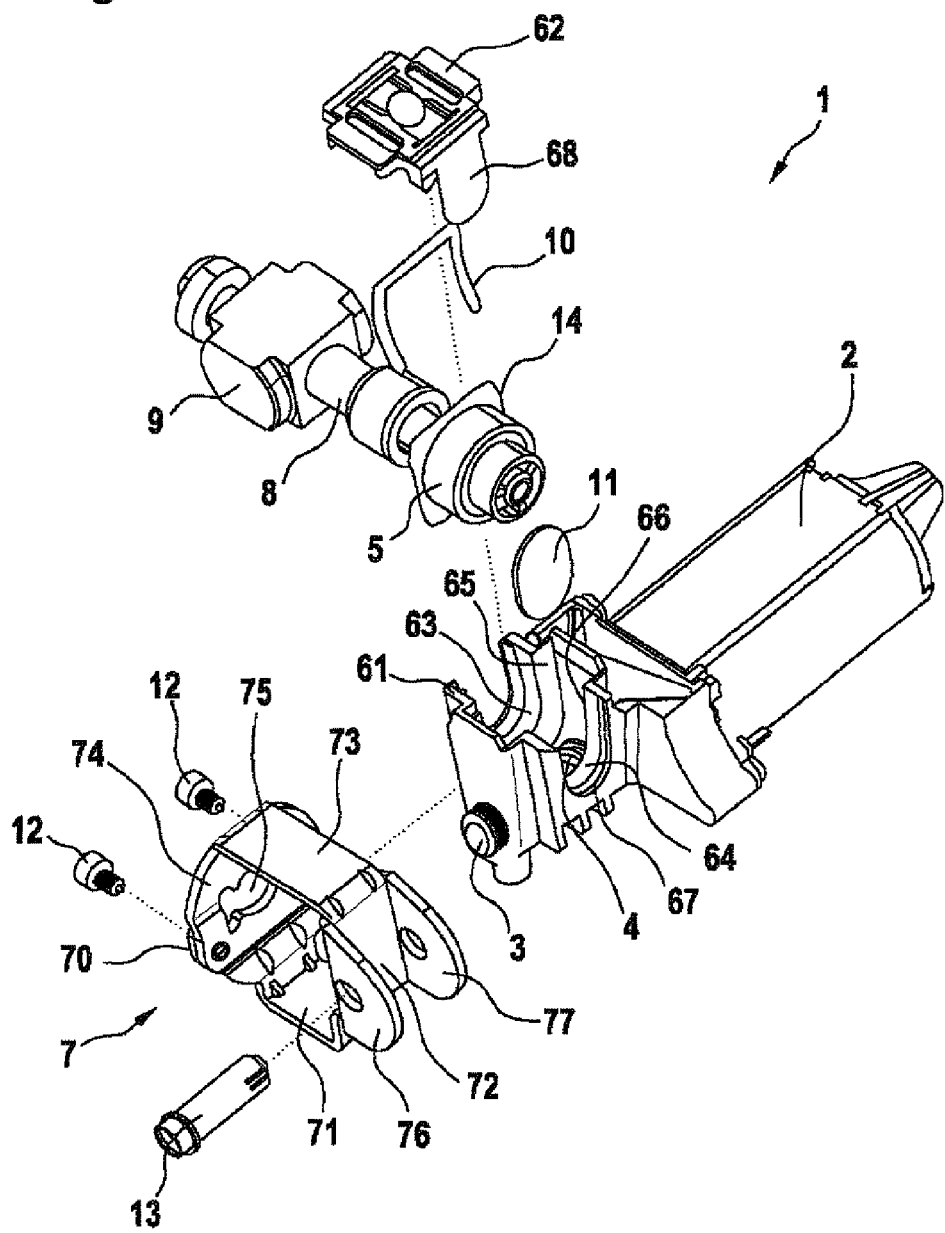
FIG. 1 shows a perspective, exploded representation of a transmission drive unit according to an exemplary embodiment of the invention.

As can be seen from FIG. 1, in particular, the transmission drive unit 1 comprises a drive motor 2 having an output shaft 3, on which an output toothing 4 is provided. The transmission drive unit 1 further comprises a threaded spindle 8, which is disposed at right angles to the output shaft 3. Disposed on the threaded spindle 8 is a worm wheel 5 that is in engagement with the output toothing 4 of the output shaft 3. A spindle nut 9 is additionally provided on the threaded spindle 8. The spindle nut 9 constitutes a first interface, for example to a vehicle seat.

The transmission drive unit 1 further comprises a first housing part 6 of plastic and a second housing part 7 of metal, preferably of aluminum. The first housing part 6, for its part, is again realized in two parts, having a main housing body 61 and a housing cover 62. A clip connection, for example, can be provided between the main housing body 61 and the housing cover 62. The housing cover 62 further comprises a tab 68, which is disposed at a 90° angle in relation to the cover surface (see FIG. 1). The first and the second housing part 6, 7 constitute a transmission housing, in which the output toothing 4 and the worm wheel 5 are accommodated.

All functional surfaces for supporting the threaded spindle 8 are provided on the first housing part 6. More precisely, a first radial bearing 63, a second radial bearing 64, a first axial bearing 65 and a second axial bearing 66 are provided on the first housing part 6. Further interfaces for coupling, for example to a vehicle body, are provided, in the form of a first flange 76 and a second flange 77, on the second housing part 7 produced from metal. For this purpose the two flanges 76, 77 each have a through opening, into which a spacer sleeve 13 is inserted. The second, metallic housing part 7 has a circumferentially closed form, and comprises a first side part 71, a second side part 72, a third side part 73 and a fourth side part 74. A through opening 75, for the through passage of the threaded spindle 8, is provided in the fourth side part 74. Further, an overlap 70 is provided on the fourth side part 74. The second housing part 7 in this case can be opened in the region of the overlap 70 and thus be joined via the threaded spindle 8. The overlap 70 is then restored and the two partial regions of the second side part 74 are connected to one another by means of two screws 12.

In the assembled state, the second housing part 7 thus surrounds a partial region of the first housing part 6 produced from plastic. The second housing part 7 in this case is used, in particular, for fixing the transmission drive unit 1 to, for example, a body of a vehicle.

Further, the transmission drive unit 1 comprises a plate element 11, which, in the axial direction of the threaded spindle 8, is disposed at a first end 81 of the threaded spindle 8. As can be seen from FIG. 3, in particular, the plate element 11 in this case is parallel to the tab 68 of the housing cover 62 and is in bearing contact with this tab. The plate element 11 in this case is disposed in a slot 67 in the main housing body 61.

Further provided is a thrust plate 14, which is disposed directly adjacently to the worm wheel 5, and on which the spring element 10 bears.

According to the invention, therefore, interfaces of the transmission drive unit 1 at the spindle nut 9 and at the flanges 76, 77 can be separated from functional surfaces, which are disposed exclusively on the first housing part 6. The first housing part 6 can therefore be injection-molded from plastic, and the respective functional surfaces can also be directly injection-molded together with it, without need for after-treatment of the functional surfaces. In this case, the interfaces on the second housing part 7 that take up force can be formed from metal, such that, for example, forces in the case of an accident do not result directly in destruction of the transmission drive unit 1. The forces can be transferred, in particular via the flanges 76, 77, into a customer structure.

Figure 2:
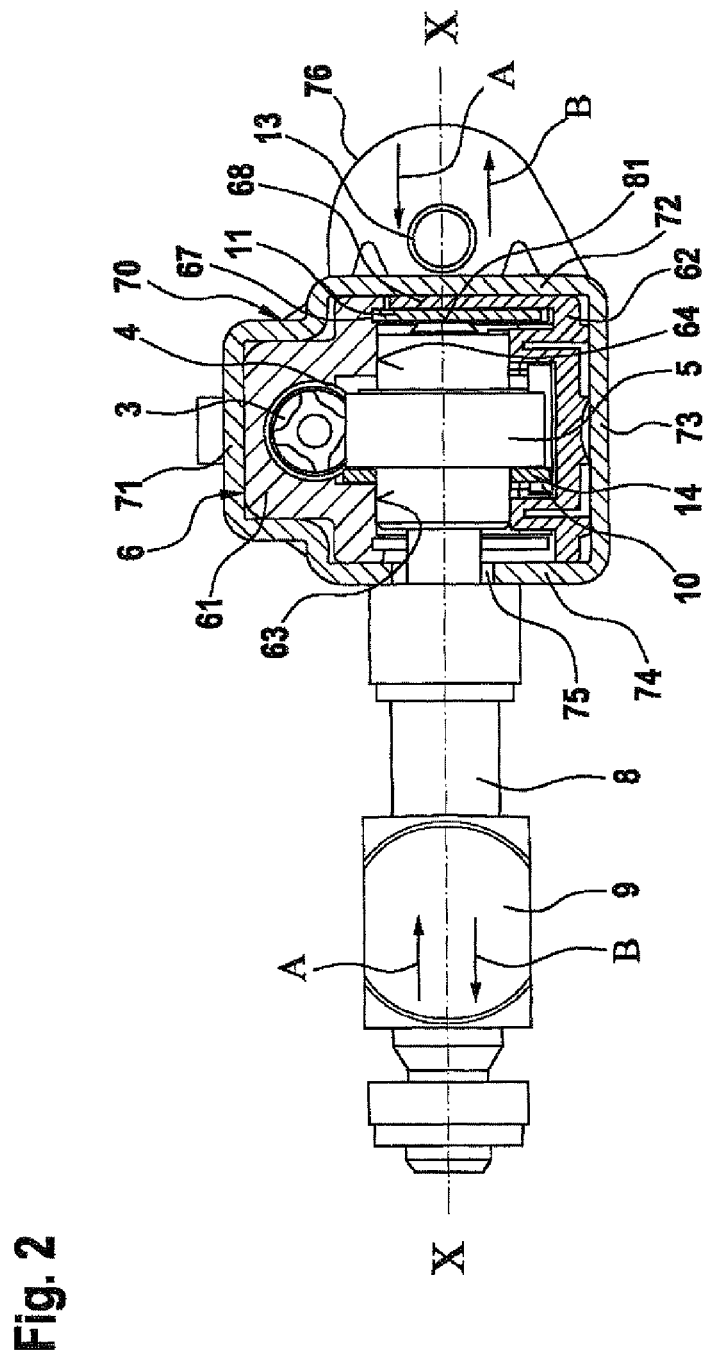
FIG. 2 shows a schematic sectional view of the transmission drive unit according to the invention.
Figure 3:
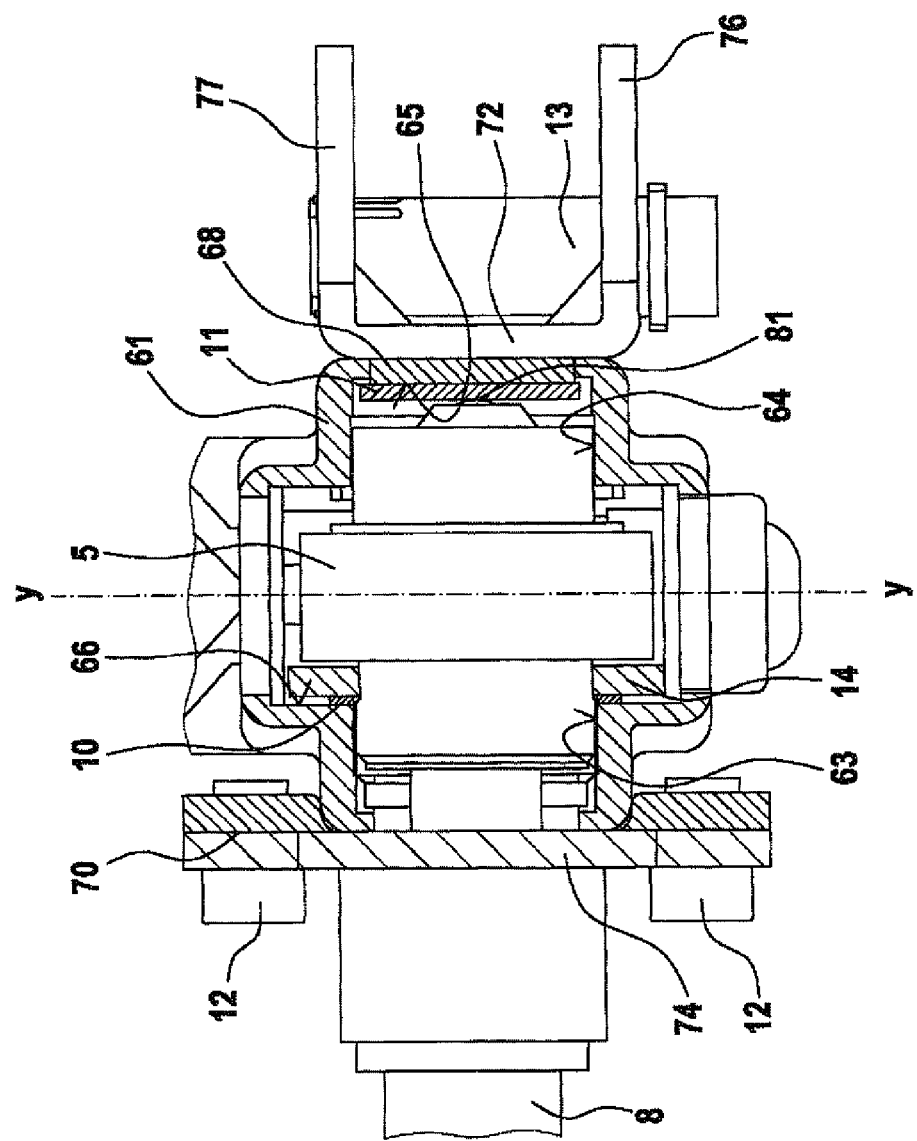
FIG. 3 shows a sectional view along a section plane shown at 90° to FIG. 2.
Figure 4:
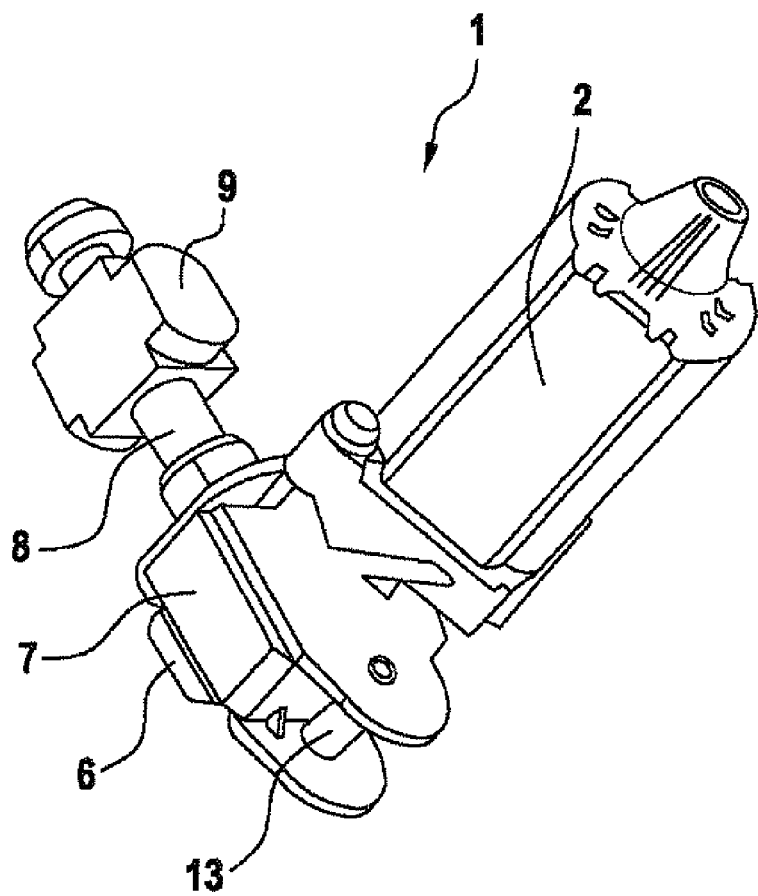
FIG. 4 shows a perspective view of the assembled transmission drive unit of the preceding figures.
Figure 5:
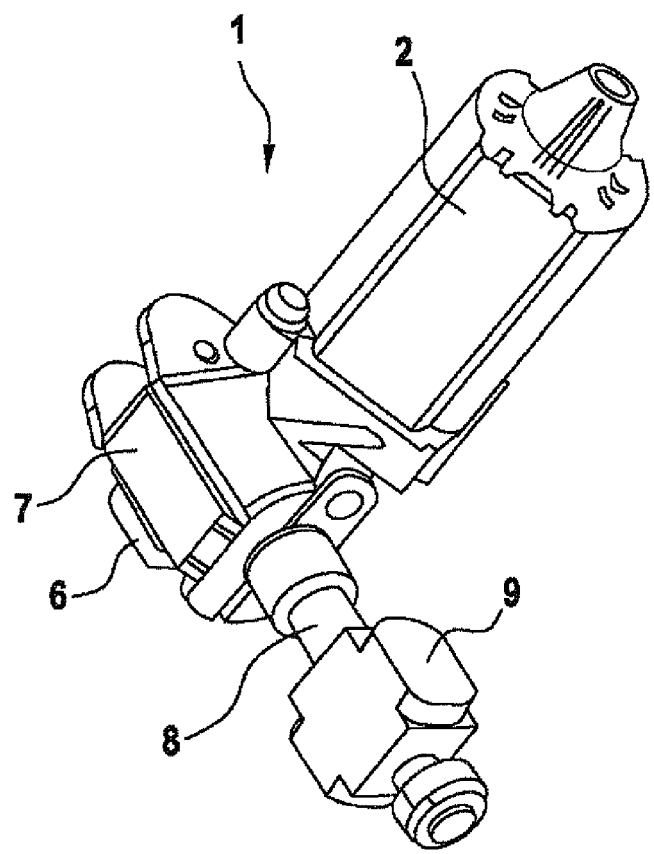
FIG. 5 shows a perspective view of the transmission drive unit wherein a threaded spindle is fitted in a direction that is 180° opposite to FIG. 4.

In FIG. 2, compressive forces at the mechanical interfaces are indicated by the arrows A, and tensile forces are indicated by the arrows B. As shown clearly by FIG. 2, in particular, in this case the threaded spindle 8, or the worm wheel 5, is always supported in the axial direction on one of the axial bearings on the main housing body 61, or on the housing cover 62. Radial support is effected at the radial bearings 63, 64 of the main housing body 61. As can be seen from FIGS. 1 and 3, there is obtained a structure that, both on the first housing part 6 and on the second housing part 7, is axially symmetrical in relation to a plane of symmetry Y-Y and in relation to a central axis X-X of the threaded spindle 8, in a plane perpendicular to the output shaft 3. The plane of symmetry Y-Y in this case is perpendicular to the central axis X-X. This makes it possible for the threaded spindle 8, as shown in FIGS. 1 and 4, to be disposed on a first side of the drive motor 2 or, as shown in FIG. 5, to the side of the drive motor 2 that is opposite by 180°. No additional components are necessary in this case, it being necessary only that the cover 62, the spring 10 and the plate 11 be turned correspondingly by 180° for fitting. As a result, according to the invention, a high number of matching parts can be achieved. The threaded spindle 8 in this case can be disposed, in the direction of view of the output shaft, on the left or on the right of the output shaft, or above or below the latter. Further, since interfaces of the transmission drive unit 1 to external components are provided only at the spindle nut 9 and at the second housing part 7, it is necessary, in the vehicle sector, for example, to hold in reserve only variants of these two components for various customers. Since this affects only two components of the entire transmission drive unit 1, however, production and storage costs, in particular, can be reduced significantly.

When a compressive force is transmitted to the transmission drive unit via the interfaces (spindle nut 9 or tabs 76, 77), the plate 11 is pressed in the axial direction against the tab 68 of the housing cover 62, the tab 68 resting on the second housing part 7. If a tensile force (arrows B) occurs, axial support is effected via the worm wheel 5 and the thrust plate 14, which rests on an undercut in the first housing part 6. The first housing part 6 then transfers the tensile forces into the second housing part 7.

It is to be noted that the second, metallic housing part 7 is held on the first housing part 6 by means of a compression connection. Particularly preferred in this case is a combination of a positive and non-positive connection. In addition, it is to be noted that the modularity can be further increased through the use of the spacer sleeve 13 on the two flanges 76, 77, since this makes it possible to enable adaptation to individual interfaces of a customer in each case through use of a respectively like housing part 7, by provision of differing connection widths and bore diameters of the spacer sleeve 13.

Furthermore, the separation of functional surfaces and mechanical interfaces provides for increased variability in the disposition of the treaded spindle, also without additional components, as shown clearly by FIGS. 4 and 5.

The invention claimed is:

1. A transmission drive unit (1) comprising:
   a drive motor (2) having an output shaft (3) and an output toothing (4),
   a threaded spindle (8) having a worm wheel (5) that is in engagement with the output toothing (4),
   a plastic first housing part (6) having axial bearing locations (65, 66) and radial bearing locations (63, 64) that bear against the threaded spindle (8), and
   a metal second housing part (7) having a through opening (75) for a through passage of the threaded spindle (8), and at least one coupling region (76, 77) for fixing the transmission drive unit (1) to a component,
   characterized in that the first housing part (6) comprises a main housing body (61) and a housing cover (62), and
   characterized in that the housing cover (62) comprises a tab (68), which bears on the second housing part (7).

2. A transmission drive unit according to claim 1, characterized in that the second housing part (7) is closed circumferentially, the second housing part (7) partially surrounding the first housing part (6).

3. A transmission drive unit according to claim 1, characterized in that the second housing part (7) has an overlap (70) at which the second housing part is configured to be bent.

4. A transmission drive unit according to claim 1, further comprising a plate element (11), which bears on the tab (68) of the housing cover (62).

5. A transmission drive unit according to claim 4, characterized in that the plate element (11) is disposed in a slot (67) in the main housing body (61).

6. A transmission drive unit according to claim 1, further comprising a spring element (10), which biases the threaded spindle (8) in an axial direction (X-X).

7. A transmission drive unit according to claim 1, characterized in that at least one of the first housing part (6) and the second housing part (7) is symmetrical in relation to a plane that comprises a spindle axis (X-X) and that is perpendicular to the output shaft (3).

8. A transmission drive unit according to claim 1, characterized in that the first housing part (6) and the second housing part (7) constitute a transmission housing, in which the output toothing (4) and the worm wheel (5) are accommodated.

9. A transmission drive unit according to claim 1, characterized in that the second housing part (7) is closed circumferentially and has four side parts (71, 72, 73, 74), the second housing part (7) partially surrounding the first housing part (6).

10. A transmission drive unit according to claim 1, characterized in that the second housing part has two flanges, which project outwards, perpendicularly in relation to a side part, and at which the second housing part is configured to be bent.

11. A transmission drive unit according to claim 1, further comprising a hardened plate element (11), which bears on the tab (68) of the housing cover (62).

12. A transmission drive unit according to claim 1, characterized in that the second housing part (7) is closed circumferentially, the second housing part (7) partially surrounding the first housing part (6).

13. A transmission drive unit according to claim 12, characterized in that the second housing part (7) has an overlap (70) at which the second housing part is configured to be bent up.

14. A transmission drive unit according to claim 13, further comprising a plate element (11), which bears on the tab (68) of the housing cover (62).

15. A transmission drive unit according to claim 14, characterized in that the plate element (11) is disposed in a slot (67) in the main housing body (61).

16. A transmission drive unit according to claim 15, further comprising a spring element (10), which biases the threaded spindle (8) in an axial direction (X-X).

17. A transmission drive unit according to claim 16, characterized in that at least one of the first housing part (6) and the second housing part (7) is symmetrical in relation to a plane that comprises a spindle axis (X-X) and that is perpendicular to the output shaft (3).

18. A transmission drive unit according to claim 17, characterized in that the first housing part (6) and the second housing part (7) constitute a transmission housing, in which the output toothing (4) and the worm wheel (5) are accommodated.

\* \* \* \* \*